Nov. 24, 1942.                L. I. HALL                2,303,163
                        LIQUID LEVEL INDICATOR
                         Filed April 5, 1941
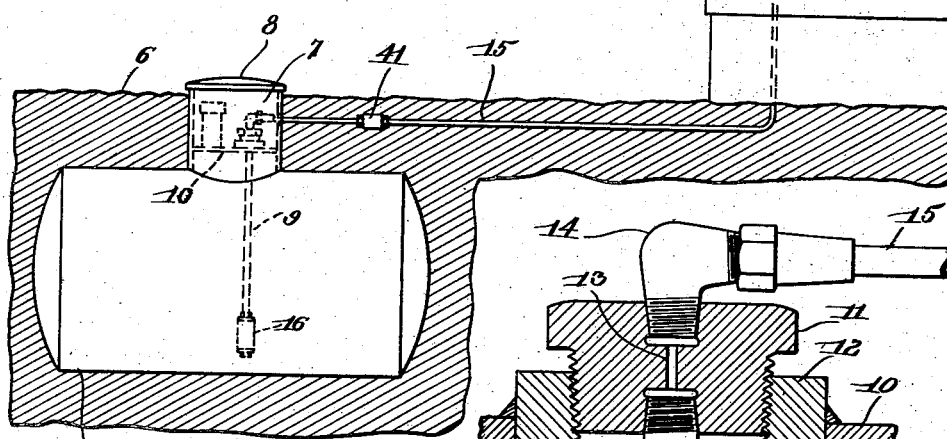
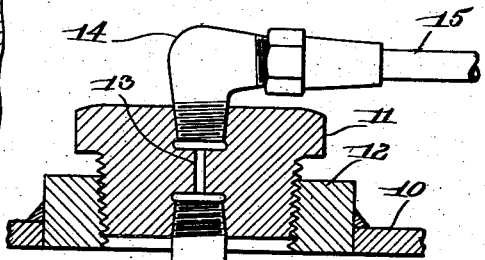
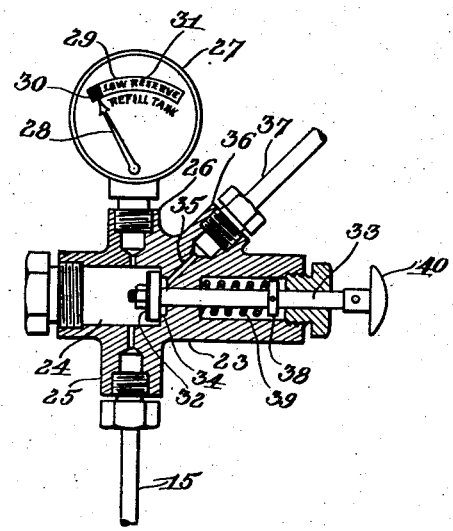
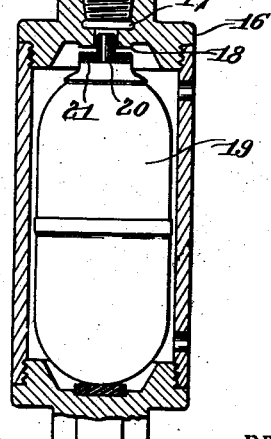
INVENTOR.
Leonard I. Hall
BY Cumpston & Shepard
his Attorneys.

Patented Nov. 24, 1942

2,303,163

UNITED STATES PATENT OFFICE 2,303,163

LIQUID LEVEL INDICATOR

Leonard I. Hall, Rochester, N. Y.

Application April 5, 1941, Serial No. 387,104

7 Claims. (Cl. 116—118)

This invention relates to liquid level indicators, and more particular to those adapted for use in systems containing liquids under pressure, such, for example, as systems containing liquefied petroleum gases, refrigerating systems and the like, for producing an indication when the liquid level passes a predetermined height.

One object of the invention is to provide an improved liquid level indicator of the character described in a more simple, efficient, and economical type of construction.

Another object is to provide an indicator of the above nature which is readily adaptable for producing an indication either near the containing system or at a distance therefrom as may be found desirable in accordance with particular conditions.

Still a further object is to provide such an indicator of a positive, pressure operated type capable of directly and reliably actuating a suitable pressure operated indicating mechanism.

To these and other ends the invention resides in certain improvements and combinations of parts, all as will be hereinafter more fully described, the novel features being pointed out in the claims at the end of the specification.

In the drawing:

Fig. 1 is a side elevation, partly in section, showing one application of the invention to a liquid petroleum gas system;

Fig. 2 is an enlarged sectional elevation of the parts associated with the gas container, and Fig. 3 is an enlarged sectional elevation of the parts associated with the indicator.

The same reference numerals throughout the several views indicate the same parts.

The invention is embodied in the present instance, by way of illustration, as applied to the liquid container of a liquefied petroleum gas system and arranged for producing at a conveniently distant point, an indication of a low liquid level at which refilling of the container is desirable.

Referring more particularly to the drawing, the invention is shown as applied to a liquid petroleum container 5 of the known cylindrical steel tank variety, located in horizontal position below the surface 6 of the ground, as in common practice. The container has the usual dome and a well 7 extending above the surface of the ground, with a removable cover 8 to afford convenient access to an assembly of the operating connections and equipment of the tank, as well understood in the art.

The present embodiment is shown as connected with the container or tank 5 through the well 7, comprising preferably a conduit or pipe 9 extending downwardly from the well 7 with its lower end adjacent the bottom of the container. The upper end of pipe 9 is preferably supported by and arranged for communication through the bottom 10 of the well, as by threading its upper end into a plug 11 threaded into a boss 12 opening through the bottom 10 of the well. The plug 11 is formed with a passage 13 providing communication between pipe 9 and an elbow 14 which is threadedly connected with the plug and also with a pipe line 15 leading through the side of the well and underground to the indicating means at its desired location.

The lower end of pipe 9 is provided with a valve seat controlled by a float operated valve member located at the desired level adjacent the bottom of the container 5. This is accomplished in the present instance by threaded attachment to the lower end of pipe 9 of a perforated float cage 16 having a passage 17 communicating with pipe 9 and leading to a valve seat 18 in the cage. The float is represented at 19 as preferably in the form of a vertically arranged, substantially cylindrical hollow sheet metal body loosely contained within the cylindrical cage 16 for a small vertical movement. The diameter of the cage is sufficiently near that of the float to guide its vertical movement, and, in addition, the float has at its upper end a plunger 20 sliding loosely in a portion of the passage 17, as a further guide, while permitting the transmission of pressure from the container 5 to an indicator hereafter described. The float is provided around the base of plunger 20 with a facing or washer 21 of suitable, yieldable material, such as "Neoprene," for cooperation as a valve member with the valve seat 18.

It will be apparent from the above described construction that as the liquid level falls in container 5, a point will be reached at which the unsupported weight of float 19 will cause it to drop to the position shown in Fig. 2, thus establishing communication between the tank space above the liquid through pipe 9 to pipe 15 leading to the indicating means. On the other hand, when the liquid level in the container is raised by a new supply, float 19 will be buoyed upwardly to press washer or valve member 21 against seat 18 and thus cut off such communication through pipe 15. When the valve is closed, as described, the unbalanced gas pressure generated above the volatile liquid in container 5 tends to aid the float in holding the valve tightly closed. The cross sectional area of the valve opening through seat 18 is preferably made quite small, however, so that such pressure will not prevent the weight of the float from opening the valve when the liquid level falls. The conduit passages leading from the valve to the indicator are also preferably made with as small a volume as practicable to reduce the amount of gas which it contains.

The indicating means, as stated, may be located at any convenient point, as by extending pipe 15 to a building indicated schematically at 22. The indicating means is shown in the present instance as comprising a casing 23 having formed therein a chamber 24. Communicating with this chamber is an inlet through a boss 25 having any known or suitable threaded means for connection with pipe 15, as shown, for supplying gas pressure from container 5 to chamber 24. Communicating with chamber 24 is an outlet through a boss 26 to which is threadedly connected the pressure indicator 27. This indicator may be of any known or suitable pressure responsive type having an indicating pointer 28 moving over suitable dial indicia 29 which are preferably marked, however, in terms of liquid level instead of pressure.

At atmosphere pressure in chamber 24, pointer 28 lies in its left hand or zero position, opposite section 30 of the dial marked in any suitable way to indicate a normal liquid supply in container 5. Any substantial pressure in chamber 24, however, moves pointer 28 to the right into a zone 31 marked to indicate a low reserve of liquid in tank 5 and the necessity for refilling the same. The gauge is preferably adjusted so that pointer 28 passes into the "low reserve" zone at any minimum operating pressure in tank 5 which may be as low, for example, as one pound above atmospheric pressure, such adjustment being selected to correspond with particular conditions, as will be readily apparent to those skilled in the art.

Chamber 24 is preferably cylindrical in shape and serves at its right hand end, as shown, as the chamber for a valve 32 fixed on the inner end of a spindle 33 sliding longitudinally in suitable bearings in casing 23. Valve 32 is preferably provided with a "neoprene" washer, as shown, for cooperation with an annular valve seat 34 controlling a passage 35 leading to an outlet through a boss 36 threadedly connected with a vent pipe 37 discharging outside the building, as shown in Fig. 1. Spindle 33 has fixed thereon a collar 38 against which bears one end of a spring 39 housed in an opening about the spindle in casing 23, as shown, for normally holding the valve to close the vent. The outer end of the spindle has a handle 40 conveniently arranged for manual depression to move the valve to open the vent, the valve being closed by the spring whenever the handle 40 is released. The opening of the vent, as described, insures the release through the vent of any pressure in chamber 24 or pipe 15, above that of the atmosphere.

The operation of the apparatus will be apparent from the above described construction. The indicator pointer 28 normally points to the operating zone 30 on the indicator dial. When the liquid level falls adjacent the bottom of the container 5, below the location of float 19, the weight of the float, thus left unsupported, will cause it to drop and open communication through pipe 15 with chamber 24 in the indicator or casing 23. The gas pressure in the container is thus transmitted to the indicator and causes movement of the pointer 28 into the "low reserve" zone, thus maintaining a distinct visual indication of the necessity for refilling the tank. As soon as the liquid supply is replenished, thereby raising float 19 and closing the opening through valve seat 18, the gas pressure in the tank is cut off from pipe 15 and the indicator. Handle 40 is then depressed, venting the pressure to atmosphere, with the result that indicator pointer 28 moves to the left into the normal zone where it remains until the fall of the liquid level in tank 5 again transmits the gas pressure to the indicator.

There may be cases in which it is not desired to transmit the full gas pressure in tank 5 to pass through the indicating system, in which case any known or suitable pressure regulator may be inserted in pipe 15, as indicated schematically at 41, Fig. 1, as, for example, in systems supplying house gas service, or where it is desired to restrict excess venting of the gas through the indicating system.

It will be obvious also that the indicating system is adapted for operating any of the known, pressure actuated, visual or audible indicating devices, as well understood in the art.

While the invention has been herein disclosed in one preferred embodiment, it is contemplated that various other embodiments and adaptations will be readily apparent to those skilled in the art and the disclosure of the present embodiment is intended to illustrate, rather than to limit the invention as set forth in the appended claims.

I claim:

1. An indicator for the liquid level of a liquid gas pressure container, comprising a valve seat, a valve member cooperating with said seat, a float for actuating said valve member, a pressure responsive indicator, a conduit communicating at one end with said valve seat in said container and at its other end with said indicator outside said container, and a manually operable vent normally closed for said conduit for relieving the gas pressure therein after said valve member has been seated by a rise in liquid level.

2. An indicator for the liquid level of a liquid gas pressure container, comprising a valve seat, a valve member cooperating with said seat, a float for actuating said valve member, a pressure responsive indicator, a conduit communicating at one end with said seat, and supporting said float at a predetermined level in said container, said conduit communicating at its other end with said indicator outside said container, and a manually operable vent for said conduit outside said container for relieving the gas pressure in said conduit when said liquid level is raised and said valve member is seated.

3. An indicator for the liquid level of a liquid gas pressure container, comprising a valve seat, a valve member cooperating with said seat, a float for actuating said valve member, a pressure responsive indicator, a conduit communicating at one end with said valve seat in said container and at its other end with said indicator outside said container, a pressure reducing device in said conduit between said valve seat and indicator, and a manually operable vent for said conduit for relieving the gas pressure therein when said valve member is seated.

4. In a liquid gas pressure container, a normally closed conduit extending through a wall thereof, a valve seat about the inlet end of said conduit in said container, a valve member cooperating with said seat, a float at a predetermined liquid level in said container for actuating said valve member to control said seat, a pressure responsive liquid level indicator communicating with said conduit outside said container, and comprising a visual indicating means and a manually operable vent for relieving the gas pressure in said conduit after said valve member has been seated by a rise in liquid level.

5. In a container for volatile liquid under the pressure of its own gas, a conduit extending through a wall of said container, a valve seat controlling the inlet end of said conduit in said container, a valve member cooperating with said seat, a float at a predetermined liquid level in said container for actuating said valve member to control said seat, a pressure responsive liquid level indicator communicating with said conduit outside said container, a pressure reducing device in said conduit between said valve seat and indicator, and a manually operable vent for said conduit for relieving the gas pressure therein after said valve member has been seated by a rise in liquid level.

6. A liquid level indicator for a container for a volatile liquid and its gas, comprising a valve seat, a valve member cooperating with said seat, a float for actuating said valve member, a normally closed conduit communicating with said valve seat, an indicator communicating with said conduit for continuously indicating the pressure therein, a vent communicating with said conduit for releasing the pressure therein, a valve for said vent, actuating means normally maintaining said vent valve closed, and manually operable means for moving said valve against said actuating means to temporarily open said vent and release the pressure which is trapped in said conduit by the seating of said valve member.

7. A liquid level indicator for a container for a volatile liquid and its gas, comprising a valve seat, a valve member cooperating with said seat, a float for actuating said valve member, a normally closed conduit communicating with said valve seat, an indicator communicating with said conduit for continuously indicating the pressure therein, a vent communicating with said conduit for releasing the pressure therein, a valve for said vent, actuating means operating to maintain said vent valve closed while said float actuated valve is open and manually operable means for moving the said valve against said actuating means while said float actuated valve is closed to temporarily open said vent and release the pressure which is trapped in said conduit by the seating of said valve member.

LEONARD I. HALL.